United States Patent [19]

van der Lely

[11] Patent Number: 4,533,000
[45] Date of Patent: Aug. 6, 1985

[54] SOIL CULTIVATING IMPLEMENTS

[76] Inventor: Cornelis van der Lely, 7 Brüschenrain, Zug, Switzerland

[21] Appl. No.: 515,974

[22] Filed: Jul. 21, 1983

[30] Foreign Application Priority Data

Jul. 30, 1982 [NL] Netherlands .......................... 8203046

[51] Int. Cl.³ .............................................. A01B 29/04
[52] U.S. Cl. ..................................... 172/68; 172/610; 172/540
[58] Field of Search ................. 172/68, 604, 540, 548, 172/549, 555, 556, 610

[56] References Cited

U.S. PATENT DOCUMENTS

| | | |
|---|---|---|
| 927,277 | 7/1909 | Peterson . |
| 2,161,714 | 6/1939 | Lindelof ........................ 172/555 X |
| 2,575,321 | 11/1951 | Traver ................................ 172/555 |
| 4,047,576 | 9/1977 | Rau ..................................... 172/540 |
| 4,200,156 | 4/1980 | Lely ..................................... 172/610 |

FOREIGN PATENT DOCUMENTS

| | | |
|---|---|---|
| 2439595 | 2/1976 | Fed. Rep. of Germany ...... 172/555 |
| 7612404 | 11/1976 | Netherlands . |
| 7900478 | 1/1979 | Netherlands . |
| 986352 | 3/1961 | United Kingdom ................ 172/540 |

Primary Examiner—Richard J. Johnson
Attorney, Agent, or Firm—Penrose Lucas Albright

[57] ABSTRACT

A packer roller for a soil cultivating implement constructed to perform a soil cultivating operation in addition to that performed by any other soil cultivating members of the implement, the roller comprising a plurality of groups or crowns of six tine-like or tooth-like projections spaced apart from one another at regular intervals along the roller's axis of rotation which are connected to a central tubular support of that roller. Each projection has a relatively sharp rear edge with respect to the roller's usual direction of rotation and, inward from the sharp edge, a relatively blunt leading edge relative to such direction so that it first penetrates into the soil relatively easily and then resists forward progress through the soil thus tending in a positive sense to produce rotation around the roller's axis of rotation. The projections are formed from pairs of shaped plates and each plate includes a sleeve surrounding the central tubular carrier of the roller. Scrapers cooperate with the convex surfaces of these sleeves between the projections.

25 Claims, 7 Drawing Figures

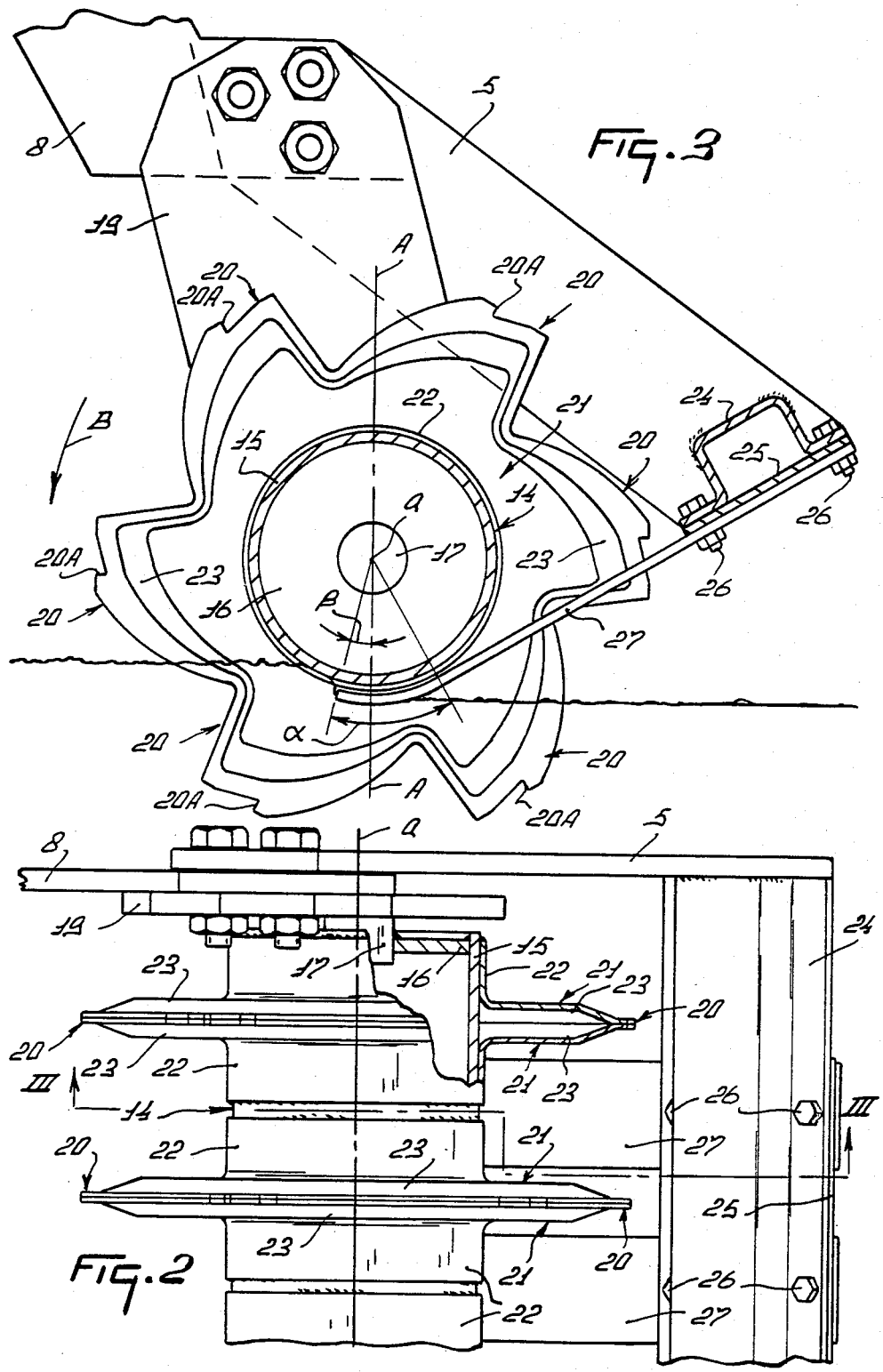

SOIL CULTIVATING IMPLEMENTS

SUMMARY OF THE INVENTION

This invention relates to soil cultivating implements or machines of the kind which comprise, or at least include, at least one soil cultivating roller that is provided with tine-like or tooth-like projections. The term "implement or machine" will be shortened to "implement" alone throughout the remainder of this document for the sake of brevity.

The rollers of implements of this kind are rotatably driven by ground contact and it is important that constant rotation thereof, without significant slipping, should occur even when working heavy soil in a wet condition or in other unfavorable operating circumstances. An object of the present invention is to ensure this desirable roller operation and one aspect of the invention accordingly provides a soil cultivating implement of the kind set forth, wherein at least a plurality of the projections exhibit a relatively blunt surface that is resistant to forward progress through the soil and a relatively sharp surface whereby, during use, the blunt surfaces facilitate constant rotation of the roller while the sharp surfaces facilitate penetration of the projections into the ground.

For a better understanding of the invention, and to show how the same is carried into effect, reference will now be made, by way of example, to the accompanying drawings, in which:

BRIEF DESCRIPTION OF THE DRAWINGS

FIG. 2 is a part-sectional plan view, to an enlarged scale as compared with FIG. 1, showing further details of the construction and mounting of a packer roller of the implement at, and adjacent to, one end of that packer roller, FIG. 3 is a section taken on the line III—III in FIG. 2.

DESCRIPTION OF THE PREFERRED EMBODIMENTS

Figure 1:
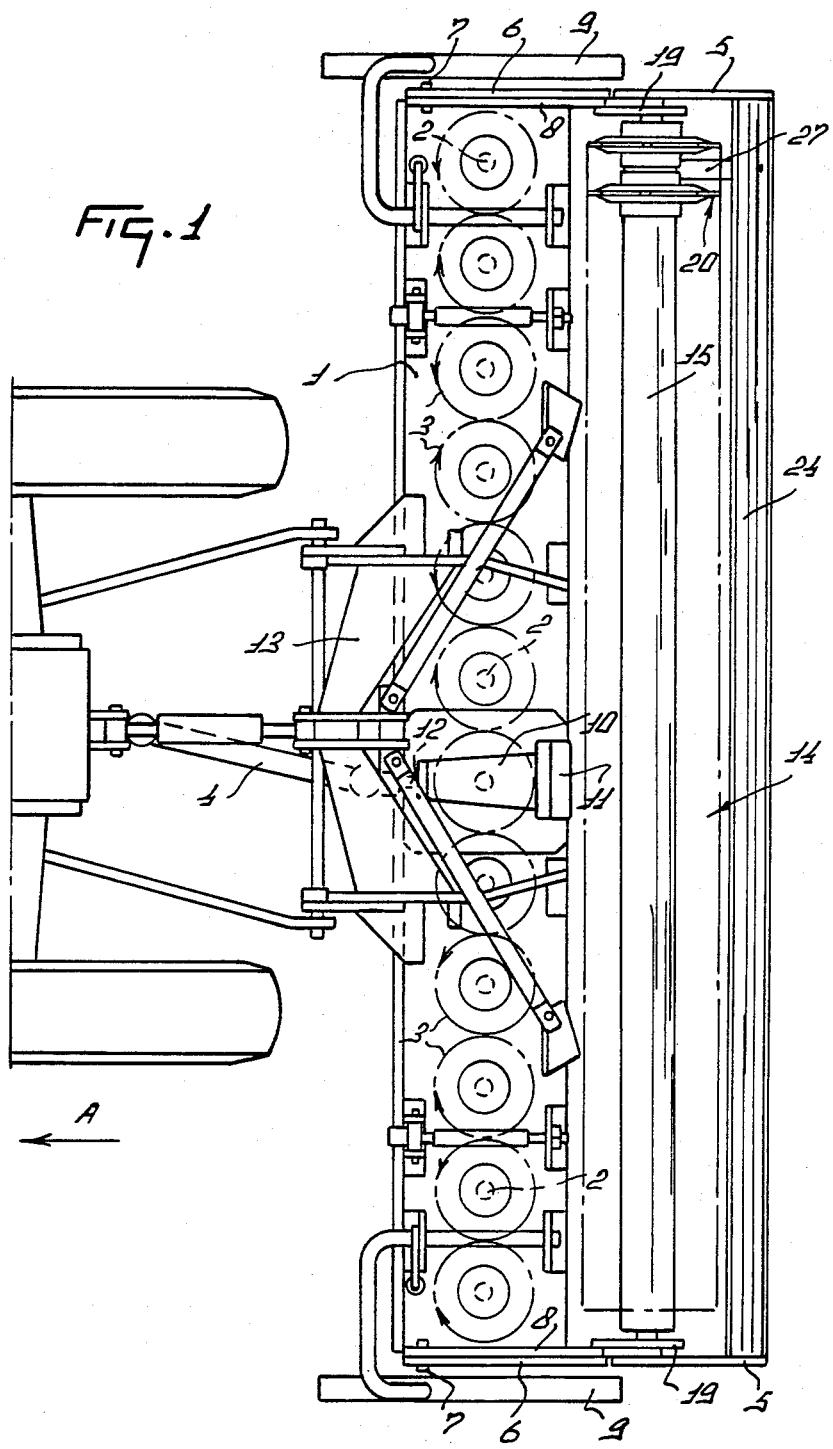
FIG. 1 is a plan view of a soil cultivating implement constructed in accordance with the invention shown connected to the rear of an agricultural tractor.

Referring to FIGS. 1 to 3 of the accompanying drawings, the soil cultivating implement that is illustrated therein is in the form of a rotary harrow and comprises a hollow elongate box-section frame portion 1 that extends substantially horizontally transverse, and usually, as illustrated, substantially horizontally perpendicular, to the intended direction of operative travel of the implement that is indicated by an arrow A in FIG. 1 of the drawings. A plurality, of which there are twelve in the example that is illustrated, of upwardly extending and usually vertically or substantially vertically disposed shafts 2 are rotatably carried by bearings in upper and lower walls of the frame portion 1 so as to extend in a single row that is parallel to the transverse length of that frame portion with the longitudinal axes of the shafts 2 spaced apart from one another at regular distances which advantageously, but not essentially, have magnitudes of substantially twenty-five centimeters. Each shaft 2 projects downwardly from beneath the bottom of the hollow frame portion 1 and is there provided with a corresponding soil working member (not visible) comprising a central hub that is firmly but releasably secured to the lowermost end of the shaft 2 concerned, two arms which extend in opposite directions from said hub, sleeve-like holders mounted at the outer ends of the arms and two rigid tines or other soil working tools including fastening portions which are firmly but releasably secured in the holders and have soil working portions which project downwardly into the ground when the implement is in use.

The opposite ends of the hollow frame portion 1 are closed by substantially vertical side plates 6 that extend substantially parallel to one another and to the direction A. The side plates 6 extend vertically above the remainder of the frame portion 1 and project some distance rearwardly thereof with respect to the direction A. Each side plate 6 carries, adjacent to its leading uppermost corner, a corresponding strong pivot 7 that is substantially horizontally disposed and in alignment with the pivot 7 that corresponds to the other one of the two side plates 6. An arm 8 is turnably mounted on each pivot 7 so as to be movable upwardly and downwardly about that pivot 7 immediately alongside the corresponding plate 6. Each arm 8 extends generally rearwardly from the corresponding pivot 7 alongside the inner surface of the corresponding side plate 6, that is to say, alongside that surface thereof which faces the center of the implement. Two shield plates 9 that both extend substantially vertically parallel to the direction A are provided immediately beyond the opposite ends of the single row of twelve (in this embodiment) rotary soil working members. The shield plates 9 are upwardly and downwardly turnable about axes that extend substantially horizontally parallel to the direction A, these axes being formed by portions of carrying arms that are turnably mounted in brackets located on top of the hollow frame portion 1 at short distances from its opposite ends. The principal function of the shield plates 9 is to co-operate with the immediately neighboring soil working members in cultivating the soil to substantially the same thorough extent as is effected by the co-operation of neighboring pairs of those members at locations closer to the center of the implement. The shield plates 9 can move upwardly and downwardly to match undulations in the surface of the soil over which the implement moves and also prevent stones and other potentially injurious objects from being flung laterally of the implement by the rapidly moving tines or other tools of its soil working members.

Each of the shafts 2 is provided, inside the hollow frame portion 1, with a corresponding straight-toothed or spur-toothed pinion 3, the sizes of the pinions 3 being such that the teeth of each of them are in mesh with those of each immediately neighboring pinion 3 in the single row of twelve such pinions 3 that are provided in the example that is being described. It will readily be apparent that, with this arrangement, each pinion 3, shaft 2 and corresponding soil working member (not visible) will revolve in the opposite direction to that of each immediately neighboring similar assembly as indicated by small arrows in FIG. 1 of the drawings.

The shaft 2 that corresponds to one of the center pair of rotary soil working members is upwardly extended through the top of the hollow frame portion 1 into a gear box 10 mounted on top of said frame portion 1. Bevel pinions and shafts (not shown) within the gearbox 10 place the upward extension of said shaft 2 in driven connection with a rotary input shaft 12 of the gearbox 10 such shaft's leading end projects substantially horizontally forwards from the front of the gearbox in substantially the direction A. The transmission between the rotary input shaft 12 and the upward extension of each said shaft 2 includes a change-speed gear 11 that is mounted at the rear of the gearbox 10. The change-speed gear 11 does not form the subject of the present invention and will not be described in detail. It suffices to say that it can be employed to change the transmission ratio between the input shaft 12 and the upward extension of one of the shafts 2 so that all twelve (in this embodiment) rotary soil working members are caused to revolve at a faster or slower rate without having to change the driving speed that is applied to the leading end of the rotary input shaft 12. The speed of revolution of the rotary soil working members is, of course, selected in accordance with the nature and condition of the soil that is to be cultivated and the particular purpose for which that soil is required after cultivation.

A telescopic transmission shaft 4 which is of a construction that is known per se, having universal joints at its opposite ends, is employed to place the leading splined or otherwise keyed end of the rotary input shaft 12 in driven connection with the rear power take-off shaft of an agricultural tractor or other moving and operating vehicle. A coupling member or trestle 13 that is of substantially triangular configuration as seen in front or rear elevation is mounted at the front of the hollow frame portion 1, with respect to the direction A, at a location midway across the working width of the implement, the apex of this coupling member or trestle 13 being strengtheningly connected to widely spaced apart locations at the rear of the hollow frame portion 1 by a pair of tie beams.

The two arms 8 project rearwardly behind the frame portion side plates 6 and their rear ends carry the rotary mountings of a soil-contacting packer roller 14 which roller 14 also serves as a soil cultivating member. The roller 14 comprises a central tubular support 15 having an external diameter of not less than substantially one hundred millimeters nor more than substantially one hundred, fifty millimeters. The opposite ends of the central tubular support 15 have corresponding circular plates 16 welded to them, each plate 16 carrying a corresponding outwardly projecting stub shaft 17 in such a way that the two aligned stub shafts 17 together define the intended axis of rotation a of the roller 14. Each stub shaft 17 is received in a freely rotatable manner in a corresponding substantially horizontal bearing, the housing of which is carried at the lower end of a corresponding downwardly and rearwardly inclined support 19, the upper end of that support 19 being releasably secured to a rear end region of a corresponding one of the two arms 8 by a group of three bolts (FIG. 3).

The external surface of the central tubular support 15 of the roller 14 carries a plurality of groups or crowns of tine-like or tooth-like hollow projections 20, each group or crown comprising six such projections 20 that are spaced apart from one another at regular angular intervals of 60° around the axis a. When the central support 15 of the roller 14 has its diameter within the preferred magnitude range mentioned above, it is also preferred that the general planes of the groups or crowns of projections 20 should be spaced apart from one another by distances of substantially one hundred, twenty millimeters and it will be clear from FIG. 2 of the drawings that the general planes of the two groups or crowns of projections 20 that are closest to the opposite ends of the roller 14 are spaced from those ends by distances which are substantially one-half the spacing between the general planes of two immediately neighboring groups or crowns of projections 20.

The successive groups or crowns of projections 20 are substantially identical to one another but are mounted on the central support 15 of the roller 14 in such a way that each of them is angularly staggered around the axis a by substantially 6° as compared with each of its immediate neighbors, the direction of stagger always being the same so that the projections 20 are arranged in six helical rows around the axis a considered lengthwise of the roller 14. Each projection 20 extends from the surface of the central support 15 by a maximum distance of substantially ninety millimeters and has a tip which, as can be seen in FIG. 3 of the drawings, is of substantially right-angled configuration. The rearmost edge of each projection 20, with respect to the intended direction of operative rotation B of the roller 14 is straight and nearly, although not strictly, radially disposed relative to the axis a and it will therefore be apparent that, where the projections 20 enter the soil in a lower region of the roller 14, those edges are foremost with respect to the direction of travel A. The tips of the six projections 20 of each group or crown each extend for a significant distance substantially along an imaginary circle with a center which coincides with the axis a. The diameter of this imaginary circle is substantially twice that of the central tubular support 15 of the roller 14. The tip of each projection 20 includes a recess 20A of saw-toothed configuration, the leading edge of each recess 20A with respect to the intended direction of operative rotation B of the roller 14, being substantially radially disposed, in relation to the axis a, whereas the rear edge of said recess is approximately tangentially disposed relative to an imaginary circle centered upon the axis a. A front region of the tip of each projection 20, with respect to the direction of rotation B, includes a short substantially straight portion, adjoining the corresponding recess 20A, that extends substantially tangentially with respect to an imaginary circle centered upon the axis a and, immediately in advance of this short substantially straight portion, with respect to the direction B, each projection 20 has a much longer regularly curved edge that is directed generally inwardly towards the surface of the support 15 from the leading end of the short substantially straight portion concerned.

Each group or crown of projections 20 is formed from two symmetrically identical pressed metal plates 21 that advantageously, but not essentially, have thicknesses of four millimeters. Each plate 21 comprises a sleeve 22 which surrounds the external surface of the central tubular support 15 with a limited degree of clearance, each sleeve 22 terminating at the end thereof which is closest to the companion sleeve 22 in a disc 23 which extends perpendicular or substantially perpendicular to the axis a. The two discs 23 of each group or crown of projections 20 comprise those six projections 20 themselves, the projections being incised in the plates 21, and also radial ring portions of the plates 21 that interconnect the sleeves 22 and the shaped projections 20. The discs 23 are all perpendicular or substantially perpendicular to the axis a and the distance between the two discs 23 that correspond to a single group or crown of projections 20 is advantageously substantially twelve millimeters in a region where those discs 23 are close to their integral junctions with the sleeves 22. At their outer edges, in which the projections 20, proper, are formed, the two discs 23 are welded or otherwise rigidly secured to one another, the contacting edges of the discs 23 in the projections 20 becoming farther spaced apart, to form the ring portions of those discs 23, by way of contour fold lines having positions which are apparent from a study of FIGS. 2 and 3 of the drawings from which, in particular, it will be apparent that said contour fold lines are much closer to one another adjacent the rear edge, with respect to the direction of rotation B, of each projection 20 than they are in the leading generally curved edge thereof. With this construction, the rear edge, with respect to the direction of rotation B, of each projection 20 will be foremost relative to the direction of travel A when that projection 20 penetrates into the soil during the use of the implement. The leading edges, with respect to the direction of travel A, of the projections 20 where they penetrate into the soil in a lower region of the roller 14 present relatively blunt surfaces to that soil which strongly resist forward penetration therethrough whereas the rear edges, in the same region of the roller, of the projections 20 have their contour fold lines much farther apart and therefore present to the soil relatively sharply inclined surfaces which will cut through the soil much more easily. The result is that the penetration of the projections 20 into the soil tends very positively to cause rotation of the roller 14 around its axis a. The shape of each group or crown of projections 20 is thus such that said projections 20 will penetrate relatively easily into the soil but present to that soil, where there is actual penetration into the ground, surfaces that are strongly resistant to progress in the direction A so that rotation of the roller 14 will cause its projections 20 to have a strong cultivating effect upon an upper layer of the soil.

When the roller 14 is being assembled, the ends of the sleeves 22 of the groups or crowns of projections 20 are spot welded to the surface of the central support 15 (see FIG. 2). Each arm 8 has a downwardly and rearwardly inclined extension 5 that is secured to the arm 8 concerned by the same group of bolts as fastens the corresponding support 19 to that arm. The lowermost and rearmost ends of the two extensions 5 are perpendicularly interconnected by a carrier 24 that extends parallel or substantially parallel to the axis a and that is of channel-shaped cross-section having outwardly directed co-planar rims at the free ends of its two limbs. The caarrier 24 is welded to the two extensions 5 and a cover plate 25 is releasably secured to the rims thereof by a plurality of substantially regularly spaced apart bolts 26. Bolts 26 also serve to secure scrapers 27 to the carrier 24 and the cover plate 25 and it will be seen from FIGS. 2 and 3 of the drawings that each scraper 27 extends downwardly and forwardly, with respect to the direction A, from the carrier 24 to bear against the curved surfaces of the sleeves 22 of two neighboring, but separate, groups or crowns of projections 20, each scraper 27 being of such a width in a direction parallel to the axis a that its opposite edges are close to the two discs 23 that corresponds to those two sleeves 22. Each scraper 27 is strip-shaped and is preferably formed from a resilient material which is advantageously spring steel. As can be seen in FIG. 3 of the drawings, the leading end of each scraper 27, with respect to the direction A, is cylindrically curved to match the curvature of the external surfaces of the sleeves 22, its leading extremity in the direction A being in advance of a vertical plane A—A which contains the axis of rotation a of the roller 14. A further plane which contains the axis a and the leading end of each scraper 27 is inclined at an angle $\beta$ to the plane A—A, said angle $\beta$ advantageously having a magnitude of substantially 15°. The cylindrically curved leading portion of each scraper 27 subtends an angle $\alpha$ at the axis a which advantageously has a magnitude of substantially 45°. Although not illustrated, the scrapers 27 may co-operate with their fastening bolts 26 by way of slots to enable the scrapers to be adjusted to a limited extent in directions that are substantially parallel to their own lengths and, instead of the carrier 24 being welded to the arm extensions 5, it may be connected thereto by way of slotted brackets and those brackets themselves may, if desired, be turnable to a limited extent about an axis that is substantially parallel to the axis a. Such an arrangement enables the scrapers 27 to be adjusted in position to some extent in a direction that is substantially parallel to the axis a and for their inclinations to the horizontal also to be adjusted.

Figure 4:
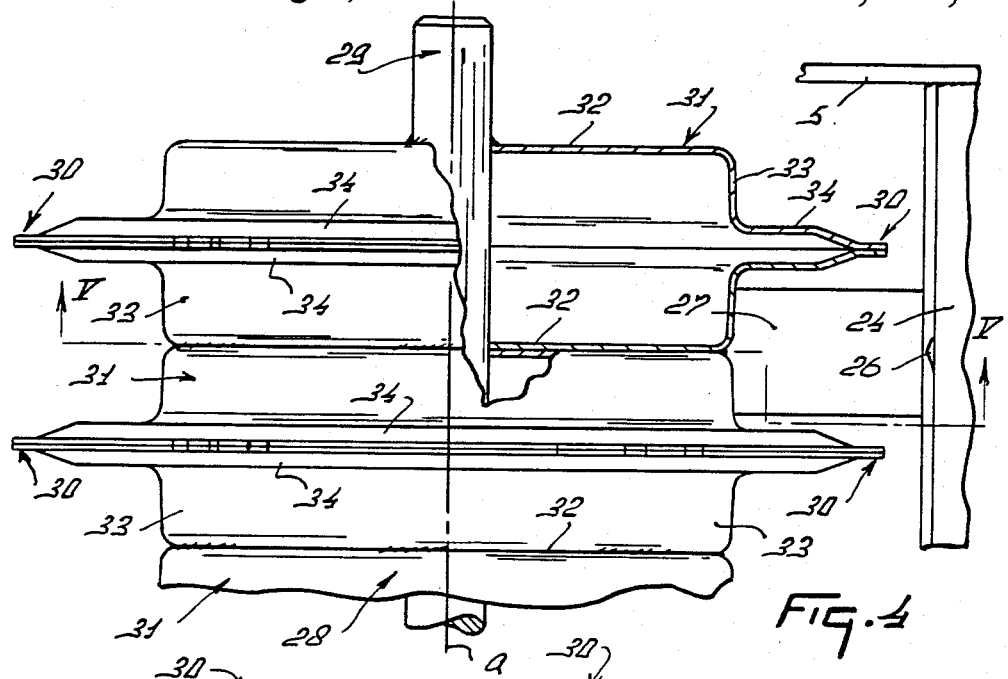
FIG. 4 is a similar view to FIG. 2, but to a further enlarged scale, illustrating the employment of an alternative form of packer roller.
Figure 5:
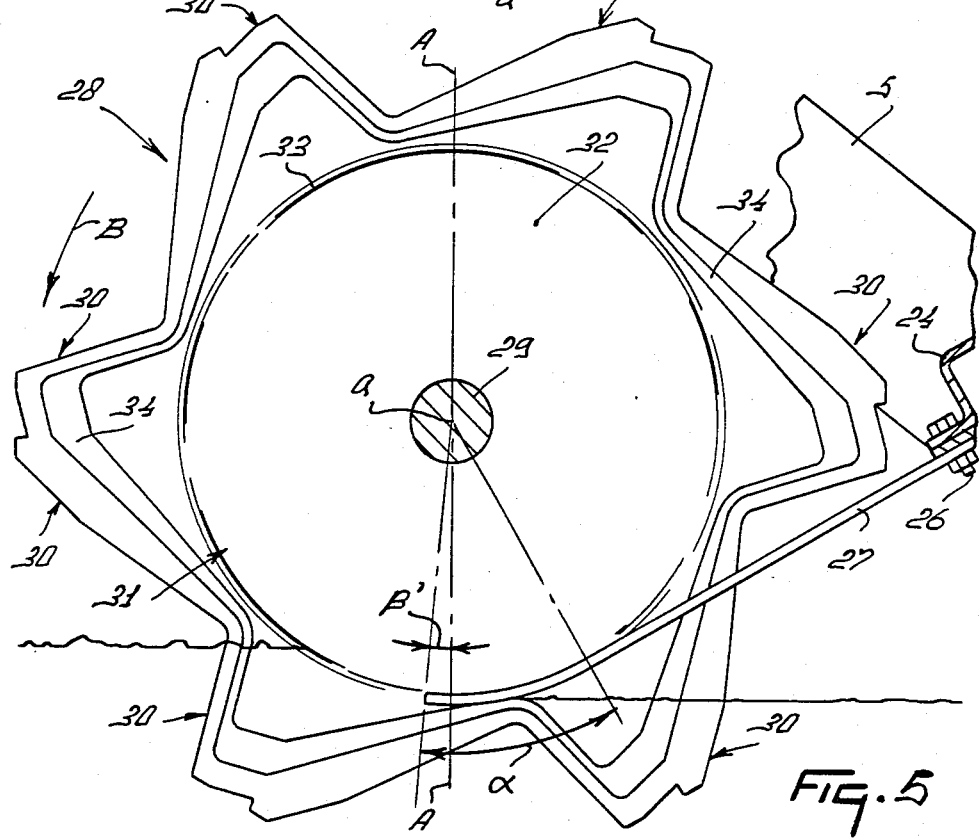
FIG. 5 is a section taken on the line V—V in FIG. 4.

FIGS. 4 and 5 of the drawings illustrate the use of an alternative packer roller 28 in which the stub shafts at its opposite ends are afforded by opposite end regions of a continuous shaft 29 that extends substantially horizontally throughout the whole of the length of the roller. A plurality of groups or crowns of tine-like or tooth-like hollow projections 30 are spaced apart from one another at regular intervals along the length of the shaft 29, each group or crown comprising six of the projections 30 that are spaced apart from one another at 60° intervals around the axis of rotation a of the roller 28 which axis coincides with the longitudinal axis of the shaft 29. Once again, the distance between the general planes of two immediately neighboring groups or crowns of projections 30 is substantially one hundred, twenty millimeters and each group or crown is staggered in the same direction around the axis a by substantially 6° with respect to each of its immediate neighbors. In this embodiment, each projection 30 has a substantially straight rear edge, with respect to the intended direction of operative rotation B of the roller 28, which is inclined at an angle of substantially 15° to a strictly radial line, the direction of inclination being forwardly relative to the direction B as considered outwardly towards the tip of each projection 30. Again, the tips of the projections 30 of each group or crown thereof substantially coincide with an imaginary circle having its center coincide with the axis a. Each tip includes a saw-toothed recess, as in the embodiment of FIGS. 1 to 3 of the drawings, and the leading edge of each projection 30, with respect to the direction of rotation B, comprises a first shorter straight portion and a second longer straight portion which portions are inclined to one another at only a very small angle and both of which are directed generally inwardly from the projection tip concerned with respect to the axis a.

As in the preceding embodiment, each group or crown of projections 30 is afforded by a co-operating pair of symmetrically identical pressed plates 31, each plate 31 comprising a circular disc 32 that extends perpendicularly with respect to the axis a from the shaft 29, the outer edge of each disc 32 being integrally connected by a 90° bend to a corresponding sleeve or shoulder 33 and the opposite edge of each sleeve or shoulder 33 being integrally connected by a 90° bend to a further disc 34 in which latter one side of each of the six projections 30, proper, is formed by incision. The two plates 31 of each pair are welded or otherwise rigidly secured to one another at the contacting outer edges of the projections 30 and center regions of the discs 32 are welded or otherwise rigidly secured to the shaft 29. It can be seen in FIGS. 4 and 5 of the drawings that, in a similar manner to the first embodiment, said further discs 34 merge into the projections 30, proper, by way of pairs of contour fold lines and that, once again, the contour fold lines at the rear of each projection 30, with respect to the direction of rotation B, provide bluntly inclined surfaces that strongly resist forward progresss through the soil in the direction A whereas the rear of each projection 30, with respect to the direction B, provides much more acutely inclined surfaces that will penetrate relatively easily into the ground. Thus, once again, the roller 28 will be caused very positively to rotate about the axis a when its projections 30 penetrate into the ground surface during operative progress in the direction A. The distance between the two further discs 34 of each group or crown of projections 30 is substantially twelve millimeters and this is substantially one tenth of the distance between the general planes of two immediately neighboring groups or crowns of those projections.

The sleeves or shoulders 34 of the successive symmetrically identical plates 31 provide a substantially cylindrically surfaced support portion of the roller 28 which support portion is of greater diameter than the central tubular support 15 in the first embodiment having a diameter which is preferably between substantially one hundred, fifty and one hundred, ninety millimeters, inclusive. The tip of each projection 30 is spaced from the cylindrical support portion defined by the sleeves or shoulders 33 at a maximum distance of substantially eighty millimeters and, once again, the plates 31 are advantageously formed from sheet metal having a thickness of substantially four millimeters. Scrapers 27 are again provided between the successive groups or crowns of projections 30 and co-operate with the curved surfaces of the sleeves or shoulders 33. However, in this case, the angle $\beta'$ (FIG. 5) which corresponds to the angle $\beta$ shown in FIG. 3 has a magnitude that is preferably only substantially 5° since the diameter of the cylindrical support portion of the roller 28 that is afforded by the sleeves or shoulders 33 is greater than in the first embodiment. The angle $\alpha$ which the cylindrically curved leading portion of each scraper 27 subtends at the axis a has a magnitude which is preferably substantially three times that of the angle $\beta'$.

Figure 7:
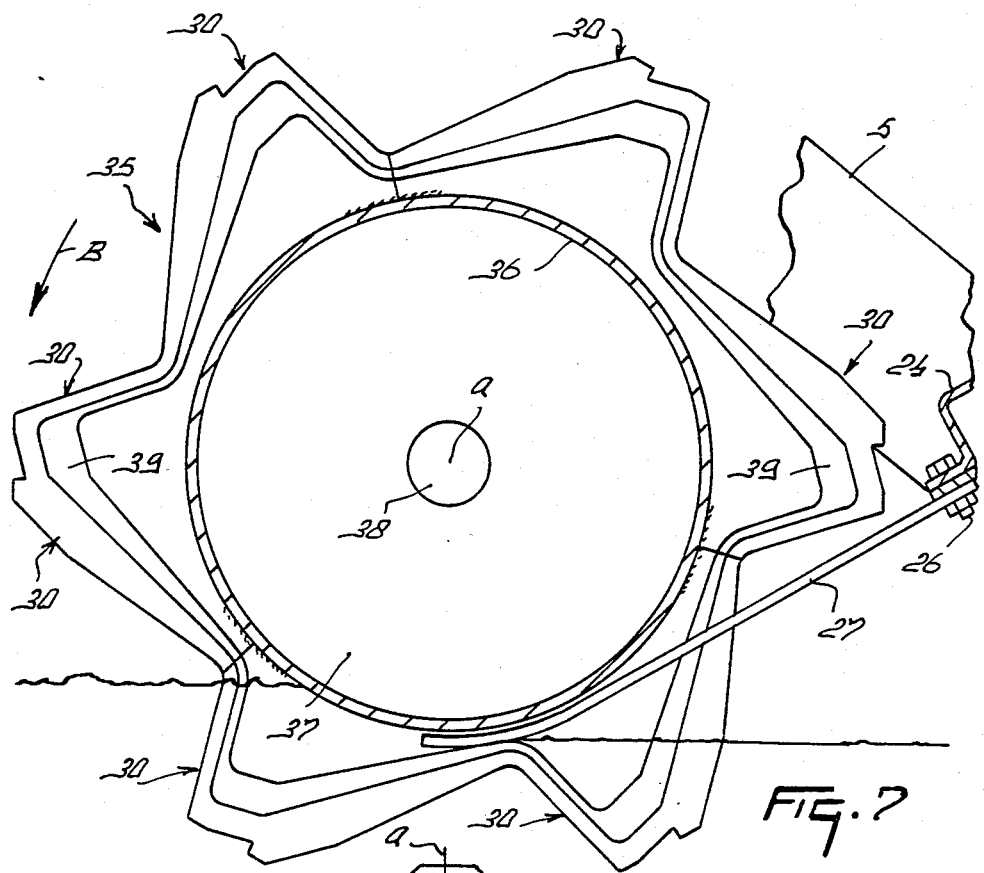
FIG. 7 is a section taken on the line VII—VII in FIG. 6.
Figure 6:
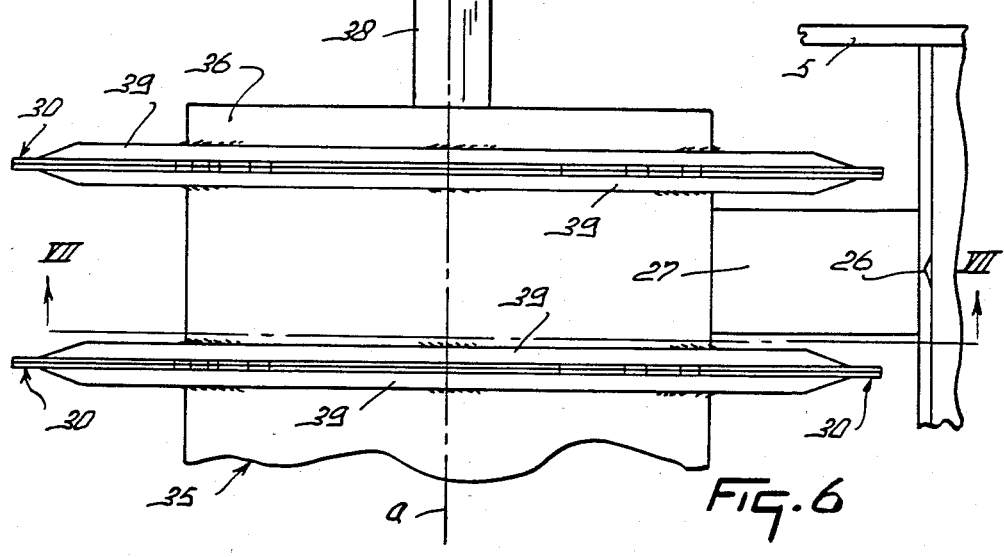
FIG. 6 is again similar to FIG. 2, but to the same scale as FIG. 4, and illustrates a third form of packer roller in an implement in accordance with the invention.

FIGS. 6 and 7 illustrate a further alternative construction in which a packer roller 35 is provided comprising a central tubular support 36 having opposite ends which are closed by circular plates 37, the outer surfaces of which have aligned stub shafts 38 welded or otherwise rigidly secured thereto to define the longitudinal axis a of the roller 35, such axis also being its intended axis of rotation. The roller 35 may be freely rotatably mounted in a similar manner to that which has briefly been described above. The groups or crowns of projections that are provided in this embodiment have substantially the same form as the projections 30 of the preceding embodiment and are therefore again designated in FIGS. 4 and 5 by the reference 30. Their general planes are spaced apart from one another in the direction of the axis a by distances of substantially one hundred millimeters and, in this embodiment, each group or crown comprises three identical integral pairs of projections 30 each of which subtends 120° at the axis a, said pairs being welded to the surface of the support 36 at the junctions between them as somewhat diagrammatically illustrated in FIGS. 6 and 7 of the drawings. Each integral pair of projections 30 comprises two co-operating symmetrically identical pressed plates 39, a minimum of welding being required to connect the two plates 39 together and to secure them in their appointed positions on the support 36. As in the preceding embodiment in which the cylindrical support is afforded by the sleeves or shoulders 33, the central tubular support 36 in this embodiment preferably has a diameter of not less than substantially one hundred, fifty millimeters and not more than substantially one hundred, ninety millimeters, inclusive. Scrapers 27 which are constructed and deployed in the same manner as in the embodiment of FIGS. 4 and 5 of the drawings are, once again, provided.

During the use of the implement that has been described, whichever of the three different packer roller constructions 14, 28 or 35 is employed, the coupling member or trestle 13 is used in a manner which is generally known per se to connect the frame of the implement to the three-point lifting device or hitch at the rear of a tractor or other moving and operating vehicle. The known telescopic transmission shaft 4, having universal joints at its opposite ends, is employed to place the splined or otherwise keyed rotary input shaft 12 of the gearbox 10 in driven connection with the rear power take-off shaft of the same tractor or other vehicle so that, as described above, the rotary soil working members that are secured to the lowermost ends of the shafts 2 will be revolved, as the implement moves forwardly in the direction A, in the directions indicated by the small arrows in FIG. 1, the speed of rotation being determined by the prior setting of the change-speed gear 11. Each rotary soil working member cultivates a corresponding strip of land that extends in the direction A but, since the effective spacing between the tines or other soil working tools of each member is greater than is the distance between the axes of rotation of neighboring shafts 2, these strips of land overlap one another to produce a single broad strip of worked spoil that will have a width of substantially three meters in the case of the example that is being described. The depth to which the tines or other soil working tools of the rotary soil working members can penetrate into the soil is preferably adjustable and is governed by the bodily level of the packer roller 14, 28 or 35 relative to that of the frame portion 1 and the rotary soil working members themselves. To this end, means (not illustrated) is provided to enable the arms 8 to be retained in selected angular settings about the substantially horizontal axis that is defined by the pivots 7, this means being well known per se.

During operation, the projections 20 or 30 penetrate into the surface of the ground to such an extent that, as shown in FIGS. 3, 5 and 7, those projections are, when in a lowermost region of the roller concerned, substantially completely beneath the ground surface. It is the leading edge, with respect to the direction of rotation B, of each projection 20 or 30 that first contacts the soil surface during rotation of the roller 14, 28 or 35 about the axis a and, since this edge is relatively sharp, it will penetrate into the ground without difficulty. The rearmost, with respect to the direction B, edges of some of the projections 20 or 30 will also be in the soil at the same time and, since these edges are rather blunt, as discussed above, they strongly resist forward progress in the direction A thus strongly urging the roller concerned to revolve about its axis a. This "pushing" effect that is produced by the "blunt" edges of the projections 20 or 30 also, it will be realized, considerably assists in forcing the much sharper edges of the projections 20 and 30 downwardly into the ground surface. A very effective rotation of the roller 14, 28 or 35 is thus produced and, even when working with heavy soil in a wet condition, slipping of the packer roller over the surface of that soil is reduced to a minimum, if not completely eliminated. The scrapers 27 between the projections 20 or 30 keep the roller 14, 28 or 35 substantially free of significant accumulations of adhering mud and themselves assist the roller concerned in crumbling and gently consolidating the worked soil to produce, in many instances of use of an implement in accordance with the invention, a seed bed giving optimum conditions for the germination and onward growth of seedlings. It is greatly preferred that the central tubular supports of the described packer rollers that are afforded by the parts 15, 33 and 36, respectively, should have diameters which do not exceed substantially two hundred millimeters and positive and continuous rotation of each roller 14, 28 or 35 around the corresponding axis a is ensured, under almost all normal operating conditions, by the drive to the packer roller concerned that is derived from the penetration of the projections 20 or 30 into the soil during operative progress in the direction A. Any adhering mud or other soil is scraped off the packer roller substantially immediately in the region where it first stuck to that roller and little resistance to forward progress in the direction A is attributable to adhering mud and the like. Since shedding of mud and other material adhering to each packer roller takes place at the bottom of the central support thereof, that mud or other adhering material will not be displaced upwardly or otherwise to any significant extent and will therefore not adversely affect the preparation of any seed bed that is being produced. The formation of the projections 20 and 30 from pre-fabricated pressed metal plates enables the described rollers to be quite quickly and easily constructed in a relatively inexpensive manner while still being strong and of relatively light weight.

It is noted that, while the packer rollers 14, 28 and 35 have all been described as being employed in combination with a row of rotary power-driven soil working members, it is within the scope of the invention to provide an implement in which such rotary power-driven soil working members are not used and which cultivates the soil by the use of such a roller alone. Moreover, if desired, two or more such soil cultivating packer rollers may be provided one behind the other in the direction A whether or not in combination with at least one row of rotary power-driven soil working members.

Although certain features of the soil cultivating implement embodiments described or illustrated or both in the accompanying drawings will be set forth in the following claims as inventive features, it is emphasized that the invention is not necessarily limited to those features and may include within its scope each of the disclosed parts of each soil cultivating implement embodiment, both individually and in various combinations.

Having described my invention, what I claim as novel and to be secured by Letters Patent of the United States is:

1. A soil cultivating implement comprising a packer roller to be used in combination with soil working members for crumbling and consolidating the worked soil to produce a seedbed optimum for germination and growth of seeds planted in said seedbed, the roller having a central supporting ground engaging means and a plurality of radially extending projections therefrom, each said projection exhibiting a substantially radially extending and relatively blunt surface that is resistant to forward progress through the soil and a substantially tangential and relatively sharp surface for penetrating into the ground, said projections arranged and constructed so that said blunt surfaces facilitate uniform rotation of said roller about its axis and said sharp surfaces facilitate penetration of said projections into the ground, each of said projections including said blunt and sharp surfaces comprising two plates which interengage at their peripheries in a plane perpendicular to the axis of rotation of said roller.

2. An implement as claimed in claim 1, wherein at least one scraper is provided for soil-shedding co-operation with said roller.

3. An implement as claimed in claim 1, wherein each said projection comprises interengaging portion of said two plates, said portions exhibiting in combination the relatively sharp soil-cutting surface region of that projection.

4. An implement as claimed in claim 1, wherein each said relatively blunt surface is afforded by portions of said two plates, said portions extending transversely to the intended direction of operative travel of the implement.

5. An implement as claimed in claim 1, wherein, as seen in side elevation, each said projection exhibits relatively inclined contour lines.

6. An implement as claimed in claim 5, wherein, adjacent an outward tip of each said projection, said contour lines are spaced farther apart from one another than they are at locations adjacent said plates' peripheries which are relatively remote from said tip.

7. An implement as claimed in claim 6, wherein where said contour lines extend in part approximately radially with resect to the intended axis of rotation of said roller and in part approximately tangentially to imaginary circles centered around that axis, said contour lines being closer to one another in said radial part than in said tangential.

8. An implement as claimed in claim 5, wherein said contour lines are defined by folds in said plates.

9. A soil cultivating implement in accordance with claim 1 comprising scrapers provided between at least some of said projections, said two plates having portions that extend substantially parallel to the intended direction of operative travel of the implement and which are spaced apart from one another in a direction parallel to said roller's axis of rotation.

10. An implement as claimed in claim 9, wherein said plates are shaped by pressing operations and each said plate comprises portions of sleeve-like configuration.

11. A soil cultivating implement in accordance with claim 1 wherein each said plate is formed of a single piece of material, said two plates each also comprising a portion of sleeve-like configuration.

12. An implement as claimed in claim 11, wherein each said projection is of hollow formation.

13. A soil cultivating implement in accordance with claim 1 wherein each said projection is of hollow formation.

14. An implement as claimed in claim 13, wherein each said projection comprises plate portions that are of sleeve-like configuration, said plate portions together comprising the outer surface of said central ground engaging and support means of said roller.

15. A soil cultivating implement in accordance with claim 1 wherein said central supporting ground engaging means comprises a plurality of relatively fixed portions of said projections which are of sleeve-like configuration and are located in side-by-side relationship.

16. An implement as claimed in claim 15, wherein each said sleeve-like portion and at least part of at least one said projection are formed as an integral prefabricated unit.

17. An implement as claimed in claim 16, wherein each said prefabricated unit is formed of a single-piece plate by a pressing operation.

18. An implement as claimed in claim 15, wherein plates are at least in part secured contact with one another.

19. An implement as claimed in claim 15, wherein an outward part of each said projection extends a significant distance substantially along the circumference of an imaginary circle centered upon the axis of rotation of said roller.

20. An implement as claimed in claim 15, wherein the leading edge of each said projection, with respect to the intended direction of operative rotation of the roller, is of curvilinear configuration.

21. An implement as claimed in claim 15, wherein the leading edge of each said projection, with respect to the intended direction of operative rotation of the roller, comprises two relatively inclined substantially straight portions.

22. An implement as claimed in claim 21, wherein the outer portion of each said projection comprises a recess of saw-toothed configuration.

23. A soil cultivating implement comprising a packer roller having a plurality of outwardly extending projections each of which exhibits a substantially radially extending relatively blunt surface that is resistant to forward progress through the soil and a substantially tangential relatively sharp surface for penetrating into the ground, whereby said blunt surfaces facilitate uniform rotation of said roller about its axis and said sharp surfaces facilitate penetration of said projections into the ground, said projections comprising interengaging portions of two plates which are profiled and contoured so that substantially radial contours of said plates provide said relatively blunt surfaces and substantially tangential contours provide said relatively sharp soil cutting surfaces of said projections.

24. A soil cultivating implement in accordance with claim 23 wherein said interengaging portions are secured together at a plane perpendicular to the axis of rotation of said roller.

25. A soil cultivating implement in accordance with claim 24 wherein said portions intergage at the peripheries of said projections and are spaced apart in their aspects inward of said perperipheries, said blunt surfaces comprising at least in part said spaced apart aspects of said portions.

* * * * *